United States Patent
Chabanne et al.

(10) Patent No.: US 11,947,544 B2
(45) Date of Patent: Apr. 2, 2024

(54) METHODS FOR COMPARING CONFIDENTIAL BIOMETRIC DATABASES

(71) Applicant: Idemia Identity & Security France, Courbevoie (FR)

(72) Inventors: Hervé Chabanne, Courbevoie (FR); Vincent Despiegel, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 17/810,491

(22) Filed: Jul. 1, 2022

(65) Prior Publication Data
US 2023/0008719 A1 Jan. 12, 2023

(30) Foreign Application Priority Data

Jul. 7, 2021 (FR) .................................. 2107334

(51) Int. Cl.
| | |
|---|---|
| *G06F 17/00* | (2019.01) |
| *G06F 16/2455* | (2019.01) |
| *G06F 16/25* | (2019.01) |
| *G06F 16/28* | (2019.01) |
| *H04L 9/00* | (2022.01) |

(52) U.S. Cl.
CPC ........ *G06F 16/24558* (2019.01); *G06F 16/25* (2019.01); *G06F 16/285* (2019.01); *H04L 9/008* (2013.01)

(58) Field of Classification Search
CPC .. G06F 16/24558; G06F 16/25; G06F 16/285; H04L 9/008
See application file for complete search history.

(56) References Cited

U.S. PATENT DOCUMENTS

| | | | | |
|---|---|---|---|---|
| 5,960,431 A | * | 9/1999 | Choy | .................... G06F 16/284 |
| 11,138,333 B2 | * | 10/2021 | Streit | .................... G06V 10/454 |
| 11,394,552 B2 | * | 7/2022 | Streit | .................... H04L 9/3226 |

(Continued)

OTHER PUBLICATIONS

E. M. Silva. Face Recognition Using Local Mapped Pattern and Genetic Algorithms. In Proceedings of the International Conference on Pattern Recognition and Artificial Intelligence. Association for Computing Machinery, 11-17, <https://doi.org/10.1145/3243250.3243262>, Aug. 2018.*

(Continued)

*Primary Examiner* — Greta L Robinson
(74) *Attorney, Agent, or Firm* — WOMBLE BOND DICKINSON (US) LLP

(57) ABSTRACT

A method for comparing a first and a second databases to determine whether an individual is represented by both an element of the first database and an element of the second database, wherein said elements are biometric data, including the implementation of the steps applying a classification model for each element of each database so as to construct a set of first and second bins of the respective first and second databases, each bin bringing together similar elements, each first bin being associated with a second bin; comparing the elements from the first database for at least one pair of an associated first bin and second bin belonging to said first bin with the elements from the second database belonging to said second bin, at least one of the first and the second databases then being encrypted homomorphically.

15 Claims, 3 Drawing Sheets

(56) References Cited

U.S. PATENT DOCUMENTS

2018/0096248 A1     4/2018   Chabanne et al.
2018/0330179 A1*   11/2018   Streit .................. G06F 18/2414
2019/0311097 A1*   10/2019   Lin ........................ G06F 21/71
2020/0313881 A1*   10/2020   Feng .................. H04L 63/0861

OTHER PUBLICATIONS

Dong et al., "Learning Space Partitions for Nearest Neighbor Search", ICLR 2020, Feb. 18, 2020 pp. 1-19.

Karapiperis et al., "An LSH-Based Blocking Approach with a Homomorphic Matching Technique for Privacy-Preserving Record Linkage", IEEE Transactions on Knowledge and Data Engineering, vol. 27, No. 4, Apr. 2015, pp. 909-921.

Pinkas et al., "Scalable Private Set Intersection Based on OT Extension", IACR, International Association for Cryptologic Research, Jul. 28, 2019, pp. 1-36.

Preliminary Research Report received for French Application No. 2107334, dated Mar. 21, 2022, 5 pages (1 page of French Translation Cover Sheet and 4 pages of original document).

* cited by examiner

[Fig. 1]
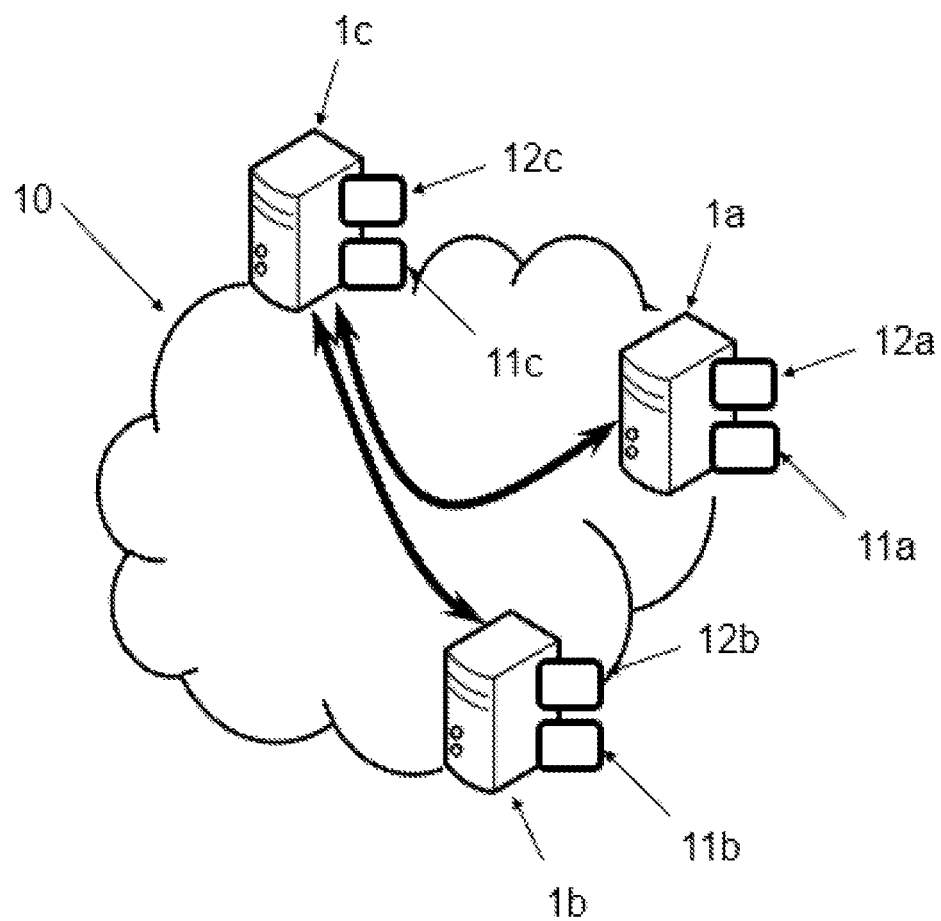

[Fig. 2a]
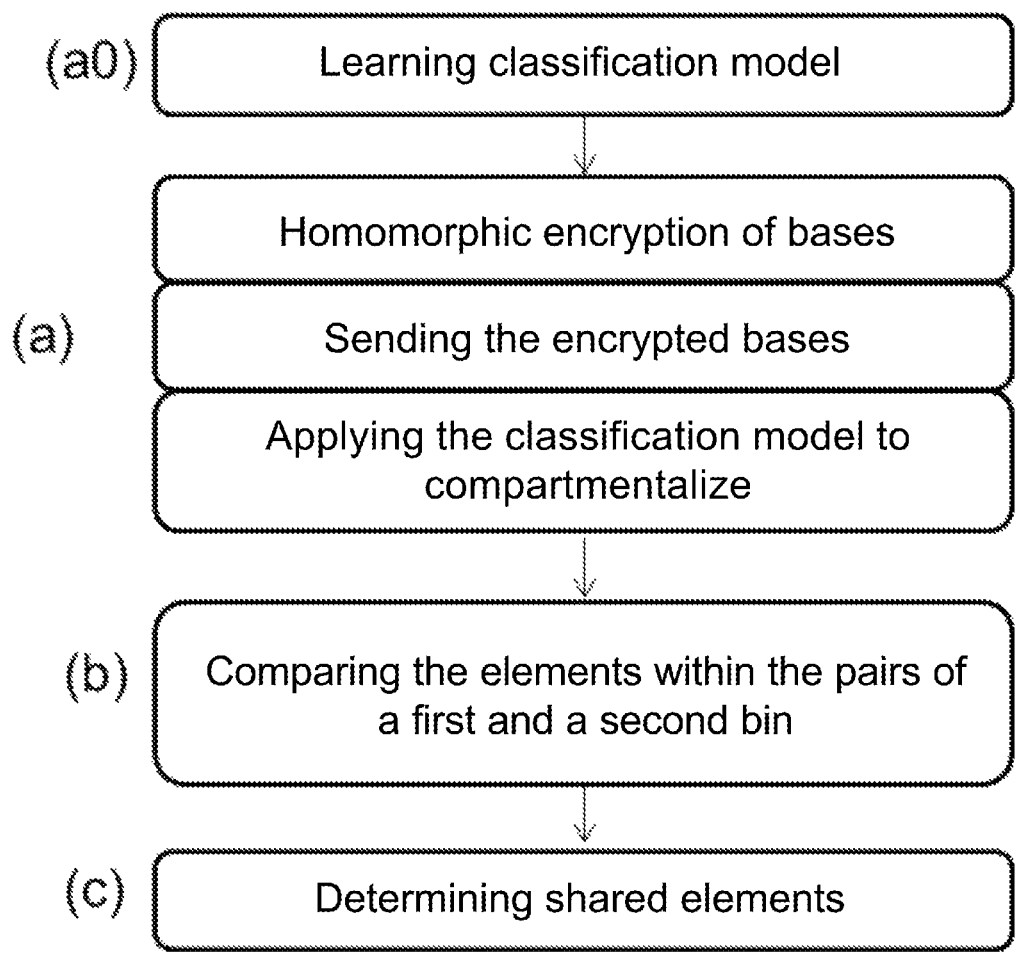

[Fig. 2b]
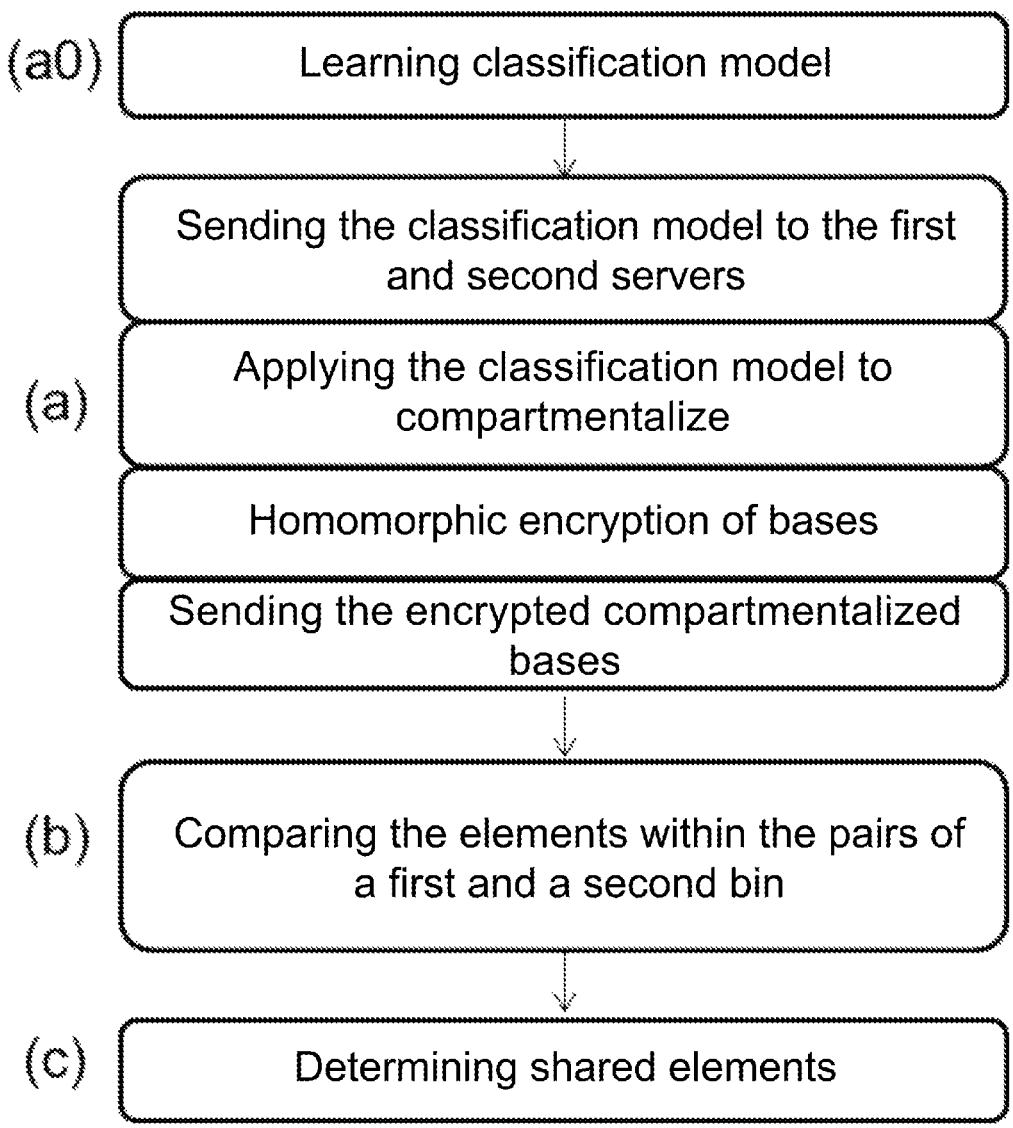

METHODS FOR COMPARING CONFIDENTIAL BIOMETRIC DATABASES

CROSS-REFERENCE TO RELATED APPLICATIONS

This application claims priority pursuant to 35 U.S.C. 119(a) to France Patent Application No. 2107334, filed Jul. 7, 2021, which application is incorporated herein by reference in its entirety.

TECHNICAL FIELD

The present invention relates to the field of biometric databases, and more particularly to a method for comparing a first and a second database.

STATE OF THE ART

The use of biometric databases and of convolutional neural networks (CNN) is known, most particularly in the policing and counter-terrorism field. More specifically, police forces have databases of photographs, for example faces of individuals involved in cases. It is then possible to train CNN's to recognize faces in video surveillance data, particularly for detecting wanted individuals. Similarly, it can be imagined that governments have biometric databases, for example passport fingerprints. It is then possible to train CNNs to recognize prints of individuals in particular.

Currently, one problem that arises is that these databases are confidential, and restricted, particularly national ones). However, it would be desirable for example for police forces in several states to cooperate and for it to be possible, for example, to know if an individual is in two biometric databases. Indeed, one of the two parties has to communicate their database to the other.

This could currently be implemented using homomorphic encryption: firstly, the database owners agree on a shared encoding (a vectorial representation) for the data, for example that obtained via the same CNN applied to the input images (photos of the biometric features), then one party transmits their homomorphically-encrypted database to the other, and the latter tests, in the encrypted domain and for each of the individuals in their own database, whether said individual is present in the encrypted database. However, this is extremely burdensome from a computational perspective. For example, if each database contains a million elements, approximately a thousand billion comparisons will be necessary, which is colossal. Furthermore, each comparison is not trivial, since, even assuming that an individual is present in the two databases, they will be represented by biometric data which are not identical (for example two different photos of the same face).

It would consequently be desirable to have a novel, secure, reliable and effective solution for comparing confidential databases.

PRESENTATION OF THE INVENTION

According to a first aspect, the present invention relates to a method for comparing a first and a second databases to determine whether an individual is represented by both an element of the first database and an element of the second database, wherein said elements are biometric data, in particular facial images of individuals, comprising the implementation, by data processing means of at least one server, of the steps of:

(a) For each element of each database, applying a classification model so as to construct a set of first bins of the first database and a set of second bins of the second database, each bin bringing together similar elements, each first bin being associated with a second bin;

(b) For at least one pair of an associated first bin and second bin, comparing the elements from the first database belonging to said first bin with the elements from the second database belonging to said second bin, at least one of the first and the second databases then being encrypted homomorphically.

According to advantageous and non-limiting features:

The first database is stored by data storage means of a first server and the second database is stored by data storage means of a second server; step (a) comprising the homomorphic encryption of the first database by the data processing means of the first server and/or the homomorphic encryption of the second database by the data processing means of the second server.

Step (b) is implemented by the data processing means of a third server, step (a) comprising sending, to the third server, the first and second homomorphically-encrypted databases.

Step (b) is implemented by the data processing means of the second server (1b), step (a) comprising sending, to the second server (1b), the first homomorphically-encrypted database.

Step (a) comprises, in succession, for at least one of the first database and the second database, said homomorphic encryption, said sending, and said application of the classification model implemented in the encrypted domain.

Step (a) comprises, in succession, for at least one of the first database and the second database, said application of the classification model in the non-encrypted domain, said homomorphic encryption, and said sending.

Step (a) comprises the prior sending, to the first and/or second server, of the classification model.

The method comprises a prior step (a0) of learning said classification model by the data processing means of a third server.

Step (a) comprises the addition of dummy elements into the first and/or second database.

Step (a) comprises the association of a unique identifier with each element of each database.

The method comprises a step (c) of determining whether at least one element of the first database matches an element of the second database based on the result of the comparisons.

Each bin of a database brings together similar elements of the database.

According to a second and a third aspect, the invention relates to a computer program product comprising code instructions for the execution of a method according to the first aspect for comparing a first and a second databases; and a storage means readable by computer equipment on which a computer program product comprises code instructions for the execution of a method according to the first aspect for comparing a first and a second databases.

DESCRIPTION OF THE FIGURES

Other characteristics and advantages of the present invention will appear upon reading the following description of a preferred embodiment. This description will be given with reference to the attached drawings in which:

FIG. 1 is a diagram of an architecture for implementing the method according to the invention FIG. 2a schematically shows the steps of a first embodiment of the method according to the invention, FIG. 2b schematically shows the steps of a second embodiment of the method according to the invention.

DETAILED DESCRIPTION

Architecture

The invention proposes a method for comparing a first and a second database, implemented within an architecture such as shown in [FIG. 1] by virtue of one or more servers 1a, 1b, 1c.

In any case, each server 1a, 1b, 1c is typically remote computer equipment connected to a wide-area network 10 such as the Internet network for data exchange. Each comprises processor-type data processing means 11a, 11b, 11c and data storage means 12a, 12b, 12c such as a computer memory, for example a disk.

Preferably, the two databases are stored on two different servers (1a and 1b in FIG. 1), with no interactions: the server 1a cannot access the database of the server 1b and vice-versa. The server 1a storing the first database is arbitrarily referred to as first server, and the server 1b storing the second database is arbitrarily referred to as second server.

Said databases are confidential and they can be encrypted. Each database advantageously comprises a large number of elements, in particular several tens or even hundreds of thousands. For example, it involves the databases of national police forces of two states.

In this regard, said data in the databases are personal data, i.e. personal to an individual (for which confidentiality is therefore necessary), and in particular biometric data (which by definition are personal to their owner) like facial images. It should be noted that the data will not be limited to these two types of personal data, and it will be possible for example to a tattoo, a signature, a seal, etc.

The server 1c is an optional server which does not have a database, in any case does not originally have one. The role of said server 1c can easily be performed by either of servers 1a, 1b, but it is preferably a different server (i.e. partitioned) to avoid any risk of disclosing the confidential databases of the servers 1a, 1b. It is in particular a server of a security solutions provider acting for the owners of the first and second databases.

Principle

According to a first aspect, the method for comparing the first and second databases, implemented by data processing means 11a, 11b, 11c of at least one server 1a, 1b, 1c, is proposed. "Comparing databases" is intended to mean, as explained, the comparison of their elements, in particular with a view to determining (and where appropriate identifying) if at least one element is present simultaneously in the first database and the second database. In other words, preferably, the result of said comparison method is the intersection of the first and second databases.

This method is different in that it comprises a step (a) of determining, for each element of each database, a bin in the database to which said element belongs, from a set of bins, by means of a classification model. A "bin" of a database is intended to mean a subset of said database which brings together similar elements. It is understood that (1) the set of bins of a database creates partitioning of said database, i.e. that any element of the database necessarily belongs to a bin, and (2) the number of bins is predetermined and will be denoted n. It should be noted that the bins are not necessarily separate and may be a bit "broader" than necessary; for example, it will be tolerated that the same element is "duplicated" and assigned to several bins to which it might belong (as will be seen, this causes some additional calculations, but at a small cost).

As explained, a bin brings together similar elements of the database (i.e. which are close in the sense of a distance function) and it is possible for example to verify the following property "for an element of a bin, the majority of its nearest neighbors belong to the same bin". Alternatively, it might be decided to verify the property "two elements of the database belonging to the same bin are closer than two elements of the database belonging to two different bins". It is further advantageously provided that the different bins are "balanced", i.e. contain a similar number of elements. It should be noted that, in order to balance bins which are after all unbalanced, it is possible to place dummy elements therein; see below.

In practice, it is possible to define the bins by dividing the space wherein the elements of the database are valued by means of hyperplanes.

The document Yihe Dong, PiotrIndyk, Ilya P Razenshteyn, Tal Wagner: *Learning Space Partitions for Nearest Neighbor Search*. ICLR 2020, describes how it is possible to construct, for a database, bins $C_1, \ldots, C_n$; such that, when it is desired to know if a new element e is close to an element in the database, it is possible to calculate the bin, $C_i$, of this new data point and then, with a high degree of probability, the elements of the database which are close to this new element are also in $C_i$. Mathematically, denoting said classification model as M, for an element e of a database, M(e) calculates the identifier i of the corresponding bin. Said classification model is advantageously a learned model M: in particular a linear model or neural network. It should be noted that, unlike what is proposed in this document, it is possible to work on the "hypersphere", i.e. standard-1 vectors, for example for face-type biometric data.

In the case of neural networks, the output of the application of the model to an element of one of the databases is an n-size score vector: the ith value of the vector represents the probability of this element belonging to the ith bin. It is possible either to take the maximum, or provide a threshold, which makes it possible to assign the same element to "several" bins of the same database.

For convenience's sake, a bin of the first database will be referred to as first bin, and a bin of the second database will be referred to as second bin. It is understood that each first bin is associated with a second bin, in practice the ith first bin is associated with the ith second bin.

In summary, step (a) consists in constructing the sets of bins of each database. Denoting the first database A and the second database B, this gives $A_1, \ldots A_i \ldots A_n$ the n first bins of A and $B_1, \ldots B_i \ldots B_n$ the n second bins of B: for every i such that $1 \leq i \leq n$, $Ai=\{x \in A, M(x)=i\}$ and $Bi=\{y \in B, M(y)=i\}$ The trick here is that the same classification model is used for the dual compartmentalization, such that the similarity property is applied: it is known that, for an element of $A_i$, the elements of B which are close to this element are in $B_i$, and vice-versa. In other words, for an element of $A_i$, if it also belongs to B then it is in $B_i$.

Thus, in a step (b), for at least one pair of an associated first bin and second bin (and preferentially for each pair ($A_i$; $B_i$) of a first bin and of the associated second bin), the elements of the first database belonging to said first bin are compared with the elements of the second database belonging to said second bin (i.e. the elements of the first bin are compared with the elements of the second bin).

In the example presented, in which there are a million elements per database, if n=1000, the number of comparisons is only approximately a million per pair of bins (since each bin stores about a thousand elements), i.e. a billion in total, compared with the thousand billion necessary if the databases were taken in their entirety. If 1% of the elements are present in two bins of the same database, this increases the total number of comparisons by about 2%.

The method finally preferentially comprises a step (c) of determining whether at least one element of the first database matches an element of the second database based on the result of the comparisons. More specifically, if a comparison is "positive", i.e. if an element of Ai is determined to match an element of Bi, then this is indeed an element which is present simultaneously in both databases. Again, this is in particular biometric data, such that there will never be two identical elements. Step c) thus allows to determine whether an individual is represented by both an element of the first database and an element of the second database.

Two elements of personal data type match if the distance thereof according to a given comparison function is less than a predetermined threshold.

Thus, the implementation of the comparison comprises calculating a distance between the elements, the definition of which varies based on the nature of the personal data considered. The calculation of the distance comprises the calculation of a polynomial between the components of the biometric data, and may advantageously comprise the calculation of a scalar product.

For example, in the case in which the biometric data have been obtained from iris images, a conventional distance used for comparing two items of data is the Hamming distance. In the case in which the biometric data have been obtained from images of individual's faces, it is common to use the Euclidean distance.

This type of comparison is known to the person skilled in the art and will not be described in more detail.

It should be noted that it is possible to only wish to know whether or not at least one element is present in the two databases, but preferentially it is possible to wish to identify it (despite confidentiality); how to do this will be discussed below.

Encryption

The comparison in step (b) must be in the encrypted domain so as not to violate confidentiality. Thus, at least one of the first and the second databases is then homomorphically encrypted, in particular fully homomorphically encrypted (FHE, Fully Homomorphic Encryption).

It is recalled that a homomorphic encryption system makes it possible to perform certain mathematical operations on previously encrypted data instead of cleartext data. Thus, for a given calculation, it becomes possible to encrypt the data, perform certain calculations associated with said given calculation on the encrypted data, and to decrypt them, obtaining the same result as if said given calculation had been performed directly on the cleartext data.

Use is made, for example, of the Brakerski-Gentry-Vaikuntanathan (BGV), Cheon-Kim-Kim-Son (CKKS), Fast Fully Homomorphic Encryption Over the Torus (TFHE) or else Brakerski/Fan-Vercauteren (BFV) encryptions, which are entirely homomorphic.

In practice, the first database is stored by data storage means 12a of a first server 1a and the second database is stored by data storage means 12b of a second server 1b; and step (a) comprises the homomorphic encryption of the first database by the data processing means 11a of the first server 1a and/or the homomorphic encryption of the second database by the data processing means 11b of the second server 1b.

This homomorphic encryption may take place at various stages of the method, and two alternative embodiments will now be described.

In the first embodiment, represented by [FIG. 2a], said application of a classification model in step (a) is implemented in the encrypted domain by the data processing means 11c of the third server 1c connected to the first and second servers 1a, 1b. In other words, it is terminal 1c which generates the bins, but the homomorphic encryption has already taken place such that it cannot return cleartext data.

Step (a) comprises the prior sending, to the third server 1c, of the homomorphically-encrypted databases (from the first and second servers 1a, 1b). Step (b) which follows is also implemented by the data processing means 11c of the third server 1c. It is noted that this can be distributed, because the comparison of each pair of a first and a second bin is an independent task (and in the same bin pair, the comparison of elements can in turn be distributed. Thus, the third server 1c can, in practice, bring together several devices and/or comprises multiprocessor and/or multicore data processing means 11c.

Thus, in this first embodiment, step (a) comprises, in succession, said homomorphic encryption of the databases, said sending of the encrypted databases, and said application of the classification model.

In this embodiment, it is assumed that the third server 1c has the classification model, where appropriate learned in a prior step (a0), preferentially on a database dedicated to learning representing the two confidential databases (for example a public facial database if the first and second databases are confidential facial databases). This database is independent of the first and second databases and can be even larger.

In the second embodiment, represented by [FIG. 2b], said application of a classification model from step (a) is implemented by the data processing means 11a of the first server 1a for the first database, and by the data processing means 11b of the second server 1b for the second database, in the non-encrypted domain (i.e. before the homomorphic encryption).

In other words, each server generates the bins of its own data in cleartext. This embodiment is slightly less secure but much more effective, since the calculations in the encrypted domain are much more expensive in terms of computing resources.

Step (a) still comprises the prior sending, to the third server 1c, of the homomorphically-encrypted databases (from the first and second servers 1a, 1b), this time already compartmentalized. Step (b) which follows is still implemented by the data processing means 11c of the third server 1c, and can still be distributed.

Thus, in this embodiment, step (a) comprises, in succession, said application of the classification mode, said homomorphic encryption of the compartmentalized databases, and said sending of the encrypted databases.

In so far as the compartmentalization is carried out by the servers 1a, 1b, step (a) advantageously comprises the prior sending, to the first and second servers 1a, 1b, of the classification model from the third server 1c. Again, this model can be learned at the third server 1c in a prior step (a0).

It should be noted that it is possible to conceive of a hybrid embodiment of the first and second embodiment, if for example the first and second server 1a, 1b do not have anywhere near the same computing power: in this hybrid mode, for one of the first database and the second database (that of the server having the low computing power—arbitrarily the first database), the first embodiment is implemented, i.e. it is the third server 1c which implements the application of the classification model in the encrypted domain, and, for the other (that of the server having the high computing power—arbitrarily the second database), the second embodiment is implemented, i.e., the second database already compartmentalized is sent to the third server 1c (with the classification model being applied in the non-encrypted domain).

According to a third embodiment, not shown, one of the first and second server 1a, 1b (arbitrarily the second server 1b) can act as third server 1c, i.e. the other (arbitrarily the first server 1a) transfers its homomorphically-encrypted database, before or after compartmentalization (in accordance with the first or the second embodiment).

In this embodiment, the second server 1b which receives the first database from the first server 1a does not need to homomorphically encrypt its own second database (since it was never transmitted externally), but it is necessarily said second server which performs the calculations.

In summary, preferably, the second server 1b not only applies the classification model to its database in the non-encrypted domain, but most importantly does not implement any homomorphic encryption of this second database either before or after the application of the classification model. On the other hand, if it applies the classification model to the first database (if the first server 1a has not already done so), it is in the encrypted domain (since the first server implements homomorphic encryption of its database before sending).

In summary, regardless of the embodiment, step (a) comprises, in succession, for at least one of the first database and the second database, either said homomorphic encryption, said sending, and said application of the classification model implemented in the encrypted domain, or said application of the classification model, said homomorphic encryption, and said sending.

It will be retained that there are thus the five following possible cases:

- step (a) comprises, in succession, for each of the first database and the second database, said homomorphic encryption of each database (by the data processing means 11a of the first server 1a for the first database and the data processing means 11b of the second server 1b for the second database), said sending (to the third server 1c) and said application of the classification model being implemented (by the data processing means 11c of the third server 1c) in the encrypted domain; and step (b) is implemented by the data processing means 11c of the third server 1c.
- step (a) comprises, in succession, for each of the first database and the second database, said application of the classification model (in the non-encrypted domain) then said homomorphic encryption of each compartmentalized database (by the data processing means 11a of the first server 1a for the first database, and by the data processing means 11b of the second server 1b for the second database), and said sending (to the third server 1c); and step (b) is implemented by the data processing means 11c of the third server 1c.
- step (a) comprises, in succession, for the first database, said homomorphic encryption (by the data processing means 11a of the first server 1a), said sending (to the third server 1c), and said application of the classification model (by the data processing means 11c of the third server 1c) in the encrypted domain; step (a) comprises, in succession, for the second database, said application of the classification model in the non-encrypted domain then said homomorphic encryption of the compartmentalized database (by the data processing means 11b of the second server 1b), and said sending (to the third server 1c); and step (b) is implemented by the data processing means 11c of the third server 1c.
- step (a) comprises, in succession, for the first database, said homomorphic encryption (by the data processing means 11a of the first server 1a), said sending (to the second server 1b), and said application of the classification model implemented (by the data processing means 11b of the second server 1b) in the encrypted domain; step (a) comprises, for the second database, only said application of the classification model (by the data processing means 11b of the second server 1b) without homomorphic encryption; and step (b) is implemented by the data processing means 11b of the second server 1b.
- step (a) comprises, in succession, for the first database, said application of the classification model, said homomorphic encryption (by the data processing means 11a of the first server 1a), and said sending (to the second server 1b); step (a) comprises, for the second database, only said application of the classification model (by the data processing means 11b of the second server 1b) without homomorphic encryption; and step (b) is implemented by the data processing means 11b of the second server 1b.

It should be noted that, in all the embodiments, in order to enhance security, step (a) can comprise the addition (at any stage) of dummy elements (i.e. elements which do not belong to the original confidential databases) into the first and/or the second database (by the first and/or the second server 1a, 1b). The idea is to increase the number of elements in each bin so as not to be able to deduce, from the size of the bins, additional information relating to the original databases. Preferably, the dummy elements are "null" elements and/or elements knowingly distanced from the other elements of the bin such that the chances of matching are zero. As explained, the addition of dummy elements may further contribute to balancing the bins (i.e. more dummy elements are placed in the smallest bins).

Moreover, step (a) may comprise (again, at any stage) the association of a unique identifier with each element of each database. This makes it possible, during the implementation of step (c), to obtain a match between matching identifiers. In other words, if the result of a comparison is positive, the two unique identifiers of the matching elements are noted, and they are returned to the servers 1a, 1b. After decryption of the homomorphic encryption, each server 1a, 1b will be able to identify these elements, and for example the corresponding individuals.

It should be noted that it is possible to have one identifier per bin (for example the information "the jth element of the ith bin matches" is returned). If it is desired that the bin number is only revealed in the event that there is a match which does not leak more information than desired (knowing that, in the event of matching, the bin number is necessarily known), in particular in the third embodiment in which the second database remains in cleartext, it is possible to return the result of the comparison for example as $i*\text{vect}((b_{i,j})$ for $j=1$ to $n)$ instead of $i, \text{vect}((b_{i,j})$ for $j=1$ to $n)$ in which $b_{i\_j}$ is a boolean of the result of the comparison of an element with the jth element of the ith bin.

Computer Program Product

According to a second and third aspect, the invention relates to a computer program product comprising code instructions for the execution (in particular on the data processing means 11a, 11b, 11c, of one or more servers 1a, 1b, 1c) of a method according to the first aspect of the invention for comparing a first and a second databases, and also storage means readable by computer equipment (a memory 12a, 12b, 12c or one or more servers 1a, 1b, 1c) on which a computer program product is located.

The invention claimed is:

1. A method for comparing a first and a second databases to determine whether an individual is represented by both an element of the first database and an element of the second database, wherein said elements are biometric data, comprising the implementation, by data processing means of at least one server, of the steps of:
    (a) For each element of each database, applying a classification model so as to construct a set of first bins of the first database and a set of second bins of the second database, each bin bringing together similar elements, each first bin being associated with a second bin;
    (b) For at least one pair of an associated first bin and second bin, comparing the elements from the first database belonging to said first bin with the elements from the second database belonging to said second bin, at least one of the first and the second databases then being encrypted homomorphically.

2. The method according to claim 1, wherein said elements are facial images of individuals.

3. The method according to claim 1, wherein the first database is stored by data storage means of a first server and the second database is stored by data storage means of a second server; step (a) comprising the homomorphic encryption of the first database by the data processing means of the first server and/or the homomorphic encryption of the second database by the data processing means of the second server.

4. The method according to claim 3, wherein step (b) is implemented by the data processing means of a third server, step (a) comprising sending, to the third server, the first and second homomorphically-encrypted databases.

5. The method according to claim 3, wherein step (b) is implemented by the data processing means of the second server, step (a) comprising sending, to the second server, the first homomorphically-encrypted database.

6. The method according to claim 4, wherein step (a) comprises, in succession, for at least one of the first database and the second database, said homomorphic encryption, said sending, and said application of the classification model implemented in the encrypted domain.

7. The method according to claim 4, wherein step (a) comprises, in succession, for at least one of the first database and the second database, said application of the classification model in the non-encrypted domain, said homomorphic encryption, and said sending.

8. The method according to claim 7, wherein step (a) comprises the prior sending, to the first and/or second servers, of the classification model.

9. The method according to claim 1, comprising a prior step of learning said classification model by the data processing means of a third server.

10. The method according to claim 1, wherein step (a) comprises the addition of dummy elements into the first and/or second database.

11. The method according to claim 1, wherein step (a) comprises the association of a unique identifier with each element of each database.

12. The method according to claim 1, comprising a step (c) of determining whether at least one element of the first database matches an element of the second database based on the result of the comparisons.

13. The method according to claim 1, wherein each bin of a database brings together similar elements of the database.

14. A computer program product comprising code instructions for the execution of a method for comparing a first and a second databases to determine whether an individual is represented by both an element of the first database and an element of the second database, wherein said elements are biometric data, comprising the implementation, by data processing means of at least one server, of the steps of:
    (a) For each element of each database, applying a classification model so as to construct a set of first bins of the first database and a set of second bins of the second database, each bin bringing together similar elements, each first bin being associated with a second bin;
    (b) For at least one pair of an associated first bin and second bin, comparing the elements from the first database belonging to said first bin with the elements from the second database belonging to said second bin, at least one of the first and the second databases then being encrypted homomorphically,
    when said program is executed by a computer.

15. A storage means readable by computer equipment on which a computer program product comprises code instructions for the execution of a method for comparing a first and a second databases to determine whether an individual is represented by both an element of the first database and an element of the second database, wherein said elements are biometric data, comprising the implementation, by data processing means of at least one server, of the steps of:
    (a) For each element of each database, applying a classification model so as to construct a set of first bins of the first database and a set of second bins of the second database, each bin bringing together similar elements, each first bin being associated with a second bin;
    (b) For at least one pair of an associated first bin and second bin, comparing the elements from the first database belonging to said first bin with the elements from the second database belonging to said second bin, at least one of the first and the second databases then being encrypted homomorphically.

* * * * *